(12) United States Patent
Glaser et al.

(10) Patent No.: US 10,196,706 B2
(45) Date of Patent: Feb. 5, 2019

(54) SYSTEM FOR AND METHOD OF PERFORMING LASER SHOCK PEENING ON A TARGET WITH A FLUID FLOW PATH SANDWICHED BETWEEN A TRANSPARENT TO LASER LIGHT SOLID MEDIUM AND THE TARGET

(71) Applicant: UNIVERSITY OF THE WITWATERSRAND, JOHANNESBURG, Johannesburg (ZA)

(72) Inventors: Daniel Glaser, Johannesburg (ZA); Claudia Polese, Johannesburg (ZA)

(73) Assignee: University of the Witwatersrand, Johannesburg (ZA)

( * ) Notice: Subject to any disclaimer, the term of this patent is extended or adjusted under 35 U.S.C. 154(b) by 760 days.

(21) Appl. No.: 14/785,195

(22) PCT Filed: Apr. 17, 2014

(86) PCT No.: PCT/IB2014/060814
§ 371 (c)(1),
(2) Date: Oct. 16, 2015

(87) PCT Pub. No.: WO2014/170868
PCT Pub. Date: Oct. 23, 2014

(65) Prior Publication Data
US 2016/0083815 A1    Mar. 24, 2016

(30) Foreign Application Priority Data

Apr. 19, 2013  (ZA) .................................. 2013/02835

(51) Int. Cl.
*B23K 26/14*     (2014.01)
*C21D 10/00*    (2006.01)
(Continued)

(52) U.S. Cl.
CPC ............ *C21D 10/005* (2013.01); *B23K 26/02* (2013.01); *B23K 26/03* (2013.01); *B23K 26/067* (2013.01);
(Continued)

(58) Field of Classification Search
CPC .......... C21D 10/005; C21D 7/06; C21D 1/09; B23K 26/146; B23K 26/356; B23K 26/02;
(Continued)

(56) References Cited

U.S. PATENT DOCUMENTS 3,850,698 A * 11/1974 Mallozzi ............. C21D 10/005
                                                         148/515
5,744,781 A *  4/1998 Yeaton ............... B23K 26/3576
                                                         219/121.84
(Continued)

FOREIGN PATENT DOCUMENTS

WO       2012056913 A1    5/2012

OTHER PUBLICATIONS

International Search Report dated Sep. 22, 2014 (PCT/IB2014/060814): ISA/EP.

*Primary Examiner* — David B Jones
(74) *Attorney, Agent, or Firm* — Banner & Witcoff, Ltd.

(57) ABSTRACT

The invention is concerned with a system for performing Laser Shock Peeing on a target (100). The system includes a device (10) for generating and transmitting a laser pulse to the target (100) and a fluid source for supplying a fluid into a fluid flow path arranged between an inlet (20) and an outlet (22.1, 22.2). A solid medium (14), which is transparent to incident laser light (12), is located in the laser path so as to allow the laser pulse to pass through it. In use, the fluid flow path is sandwiched between the solid medium (14) and the target (100) during the laser shock peening process so that (Continued)

the fluid is in direct contact with the solid medium (14) and the target (100), thereby eliminating any air-fluid interface in the travel path of the laser pulse. The fluid is also supplied into the fluid flow path having a constant thickness such that a second shock event through cavitation in the fluid layer occurs upon the collapse of a plasma\vapor bubble generated after the laser pulse striking the target. The invention also concerns a method of performing Laser Shock Peeing using the system in accordance with the invention and, in particular, the use of the first bubble oscillation period to determine the amount of energy being delivered to the target (100). The monitoring of the energy being delivered to the target (100) provides for process diagnostics during the LSP procedure.

16 Claims, 13 Drawing Sheets

(51) Int. Cl.
| | | |
|---|---|---|
| *C21D 1/09* | (2006.01) | |
| *B23K 26/03* | (2006.01) | |
| *B23K 26/067* | (2006.01) | |
| *C21D 7/06* | (2006.01) | |
| *B23K 26/146* | (2014.01) | |
| *B23K 26/02* | (2014.01) | |
| *B23K 26/18* | (2006.01) | |
| *B23K 26/356* | (2014.01) | |

(52) U.S. Cl.
CPC ........ *B23K 26/146* (2015.10); *B23K 26/1476* (2013.01); *B23K 26/18* (2013.01); *B23K 26/356* (2015.10); *C21D 1/09* (2013.01); *C21D 7/06* (2013.01)

(58) Field of Classification Search
CPC .... B23K 26/1476; B23K 26/18; B23K 26/03; B23K 26/067
USPC .......................................... 219/121.81, 121.84
See application file for complete search history.

(56) References Cited

U.S. PATENT DOCUMENTS

| | | | | |
|---|---|---|---|---|
| 7,304,266 | B2 * | 12/2007 | Mannava | C21D 10/005 219/121.6 |
| 7,728,258 | B2 * | 6/2010 | Richerzhagen | B23K 26/146 219/121.84 |
| 8,304,686 | B2 * | 11/2012 | Sano | B23K 26/067 219/121.61 |
| 8,319,150 | B2 * | 11/2012 | Lawrence | B23K 26/03 219/121.81 |
| 9,383,276 | B2 * | 7/2016 | Enoki | B23K 26/03 |
| 2005/0092724 | A1 | 5/2005 | Warren, Jr. et al. | |
| 2008/0105666 | A1 | 5/2008 | Adachi et al. | |
| 2016/0083815 | A1 * | 3/2016 | Glaser | B23K 26/1476 72/56 |
| 2016/0333433 | A1 * | 11/2016 | Petrosky | C21D 1/09 |

\* cited by examiner

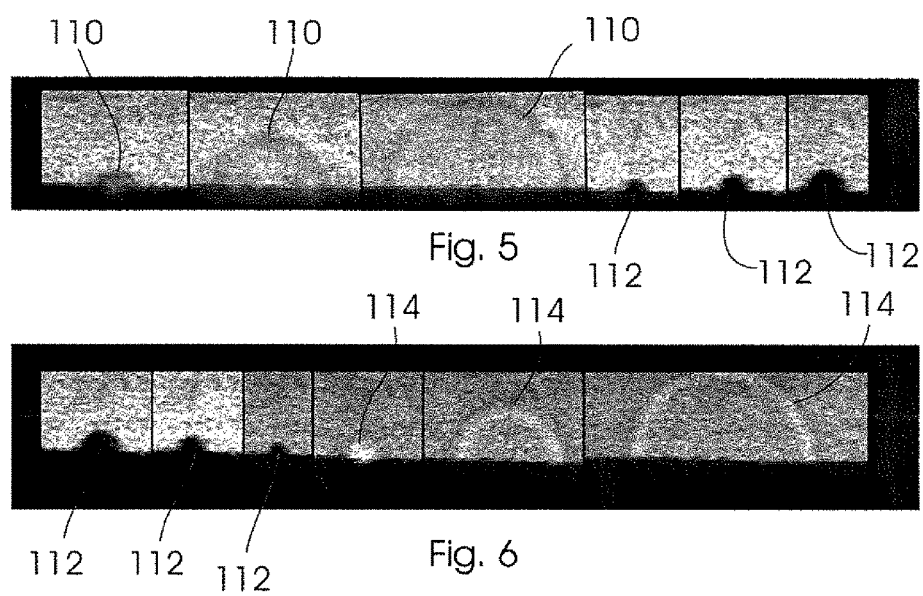
Fig. 5
Fig. 6
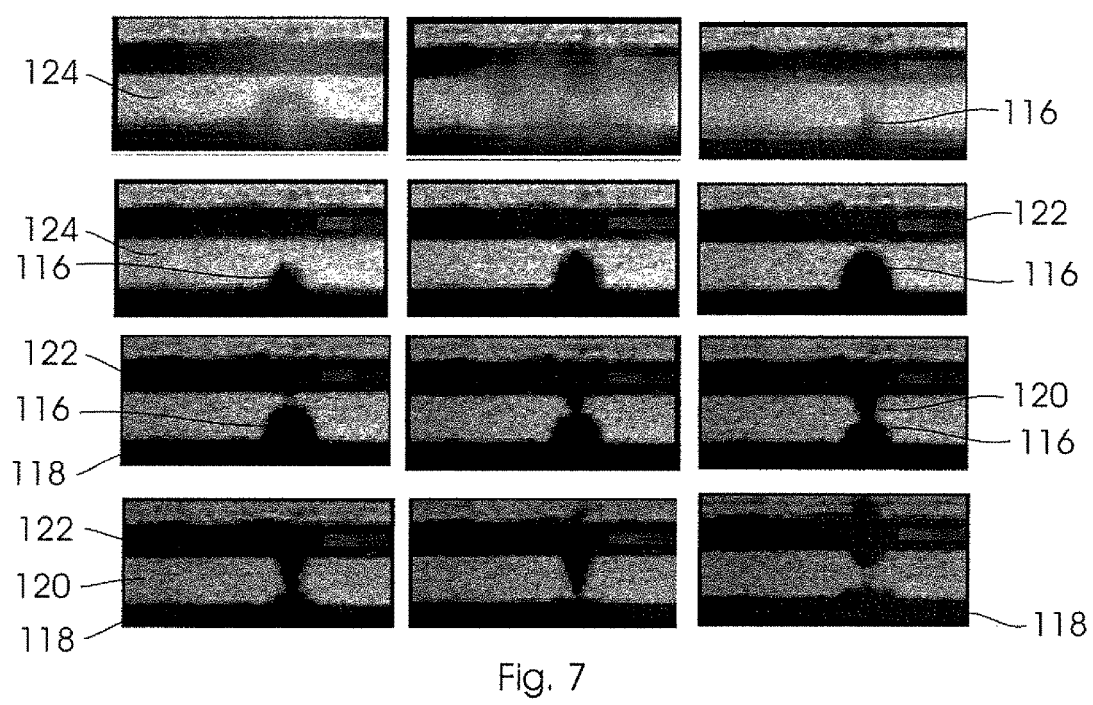
Fig. 7

SYSTEM FOR AND METHOD OF PERFORMING LASER SHOCK PEENING ON A TARGET WITH A FLUID FLOW PATH SANDWICHED BETWEEN A TRANSPARENT TO LASER LIGHT SOLID MEDIUM AND THE TARGET

The present application is a U.S. National Phase filing of International Application No. PCT/IB2014/060814, filed on Apr. 17, 2014, designating the United States of America and claiming priority to South African Patent Application No. 2013/02835, filed Apr. 19, 2013, and this application claims priority to and the benefit of the above-identified applications, which are all incorporated by reference herein in their entireties.

BACKGROUND TO THE INVENTION

This invention relates to an apparatus and method for performing Laser Shock Peening (LSP). In particular, but not exclusively, the invention relates to the use of a first bubble oscillation period of a cavitation event in determining the effective energy conversion during a Laser Shock Peening (LSP) process.

Conventional Shot Peening (SP) is a cold working process by which compressive residual stresses are introduced into a surface layer of a metal material to improve the mechanical properties. The process of SP typically includes impacting the component surface with particles such as metallic, glass, or ceramic particles to deform the material plastically, thereby changing the mechanical properties. Improvements in laser-based technology offer potential improvements in the SP process which, in turn, offers improvements in the manufacturing sector in terms of enhanced product performance, improved component quality, cost effectiveness and flexible production. Laser Shock Peening (LSP) is a SP process in which compressive residual stresses are induced in the surface layer of metal materials by impacting it with laser pulses instead of the metallic, glass, or ceramic particles used in conventional SP. Mechanical surface treatments such as SP and LSP are commonly used in the manufacturing industry as an effective measure for the enhancement of component fatigue life. There are primarily three factors that affect the operative life of a component, namely fatigue loads, wear, and corrosion. All of these factors can be moderated and controlled by enhancing the mechanical properties of the surface material of a component through the LSP process. It has been found that the fatigue life of a component treated by LSP is several times longer than that of untreated component.

As with conventional SP, performance improvements of the component can be attributed to the introduction of an engineered compressive residual stress through the metallic surface. However, the depth and magnitude of the plastically affected region when using LSP far exceed those of conventional SP. Thus, the emerging technology of LSP has been shown to improve fatigue performance beyond that achievable with conventional SP technology.

The benefits of introducing a layer of compressive residual stress into metallic components generally include increased fatigue performance (lifetime and resistance), resistance to stress corrosion cracking and resistance to fretting related failures. Although conventional SP is a well-established technique, it is limited in its range of applications due to a shallow affected depth of the plastically deformed region and a resultant relatively rough surface finish of the component. LSP technology has developed as an innovative surface enhancement process capable introducing compressive residual stresses to a greater depth and magnitude, as well as achieving a better surface finish than SP. The mechanical impulse generated for peening during the LSP process is due to laser shots from a pulsed laser (as opposed to impacting media as with conventional Shot Peening). When a pulsed laser is fired at a metallic target, mechanical recoil impulse of rapidly expanding vapour and plasma is utilised for permanent material modifications of a component. A schematic illustration of the LSP process is given in FIGS. 1 and 2. An intense pulsed laser beam irradiates a target at power intensities in the range of 1 to 10 GW/cm². Typically lasers with an output ranging from about 50 mJ to about 50 J are used with a short pulse width in the range of nano-seconds, typically in the region of between 5 and 50 nano-seconds. The incident high intensity irradiation results in vaporisation of the target surface which expands rapidly as a partially ionised gas, which is also referred to as plasma, with a high temperature in the range of 10 000 K and pressure of several Giga Pascals. The rapid pressure pulse due to the plasma expansion generates a shockwave that propagates through the metallic target, resulting in a uniaxial dynamic strain ($10^6$ sec$^{-1}$) and plastic deformation to a depth at which the peak stress no longer exceeds the Hugoniot Elastic Limit (HEL) of the metal (equivalent to the yield strength under shock conditions), which results in a state of residual stress throughout the affected depth.

In an LSP process only a mechanical impact on the work piece is desired. Heating of the material by laser irradiation is kept to a minimum using shorter laser pulses and thermal protective coatings which are also referred to as ablators. The use of laser-absorbent sacrificial coatings has been found to increase shock wave intensity, as well as to protect the surface from laser ablation and melting. By using an ablative coat the surface integrity of the component can be preserved, especially the surface finish. In some applications LSP processes are carried out without using absorbent coatings in what is referred to as Laser Peening without Coat (LPwC). From an industrial perspective, LPwC may be attractive due to elimination of the careful preparation required for application of an absorbent overlay. However the increase in surface roughness may not be feasible for some applications such as the treatment of turbine blades, for example. In addition, the surface degradation may reduce some potential for increased fatigue performance.

Since the primary mechanism of LSP is due to a high pressure pulse generation due to plasma expansion, the LSP process typically employs a confinement regime in order to confine and enhance the magnitude of the pressure pulse delivered to the target by up to 3 orders of magnitude as opposed to freely expanding plasma. Confinement may be achieved by any material sufficiently transparent to laser irradiation, such as quartz for example. However, for practical considerations water is generally used as a confinement medium. A confinement regime wherein water is used as a confinement medium is also sometimes referred to as the Water Confinement Regime or Mode (WCM). The terms "indirect ablation mode" and "confined ablation mode" are also sometimes used to describe a regime in which any confinement medium is used, whereas the term direct ablation is used where no confinement medium is used i.e. when the plasma expands freely in air.

In LSP processes utilising an indirect ablation mode in which water is used as the confinement medium, a nozzle is typically used to deliver a type of water spray or jet to the surface of the component that is being treated. Alternatively, the component that is being treated is submerged completely under water. Schematic illustrations of these two prior art methods are given in FIGS. 3 and 4 respectively.

One of the problems experienced with using a thin water layer or spray as a confinement layer is that air breakdown may occur before the air/water interface. The air breakdown is typically due to the atomisation of water droplets that are ejected out to the atmosphere after each pressure pulse generated after the laser shot. These small water droplets act as breakdown initiation sites due to absorption of high laser intensities. In a commercial LSP process the laser is operated on repetition to fire sequential laser shots at a target for coverage of large treatment areas. The occurrence of air breakdown results in an unknown amount of energy being delivered to the target, thereby reducing process robustness.

The duration until the target area is sufficiently covered with a uniform and laminar water layer thickness is significant as this essentially limits the repetition rate operable during the LSP process. In other words, the fact that the thin layer of water must be given sufficient time to recover before the next laser shot can be fired limits the frequency at which the laser shots can be fired at the target.

Turning now to the prior art method of submerging a component under water, an obvious problem with this method is the size limitations placed on the component by the size of the water bath. Accordingly, in a LSP process employing this method, the range of components that are treatable is limited as some components can simply be treated due to their shape and dimensions.

Since engineered residual stresses can potentially be introduced into any metallic component, there are a multitude of potential industrial applications for LSP. For example, LSP is currently being used in the automotive, marine, power generation, biomedical, and most extensively the aerospace industry. In recently times LSP has also been considered for applications in which tensile residual stresses are a consequence of the manufacturing process, such as subtractive machining methods, including milling, broaching, grinding, laser cutting, as well as welding in joints. However, the commercialisation of LSP is primarily due to the aerospace industry, which remains the market leader of this emerging technology. Typically high value components such as titanium gas turbine blades are treated for enhancements in component fatigue life and resistance to foreign object damage. Recently, there have been developing interests in using LSP technology in integral airframe structural components.

It is an object of this invention to alleviate at least some of the problems experienced with existing LSP processes. It is a further object of this invention to provide a system and method for carrying out an LSP process that will be useful alternatives to existing systems and methods.

In particular, it is an object of the present invention to provide a confinement regime to optimise the shock induced by the laser beam is through the occurrence of a cavitation shock event by maintaining a water layer thick enough for the occurrence of such a cavitation event. It is another object of the invention to measure the first bubble oscillation period of the cavitation event in order to provide a process diagnostic of effective energy transfer to the target.

It is yet another object of the invention to provide a means for creating a water confinement layer with dimensions that are not affected by splashing or water ejection due to the pressure pulse generated. It is yet another object of the invention to provide for the accurate controlling of the thickness of confinement layer so as to optimise the shock effects which introduce the compressive residual stresses. Another object of the invention is to reduce plasma breakdown in the air as well as at the air/water interface before the laser beam reaches the surface that is being treated, thereby resulting in a more repeatable laser energy delivery.

SUMMARY OF THE INVENTION

A system for performing Laser Shock Peening on a target, the system including:
 a device for generating and transmitting a laser pulse to the target;
 a fluid source for supplying a fluid:
 an inlet through which the fluid is, in use, supplied;
 an outlet through which the fluid is, in use, dispensed;
 a fluid flow path arranged between the inlet and the outlet; and
 a solid medium which is transparent to incident laser light to allow the laser pulse to pass through it;
 wherein the fluid flow path is sandwiched between the solid medium and the target in use during the laser shock peening process so that the fluid is in direct contact with the solid medium and the target, thereby eliminating any air-fluid interface in the travel path of the laser pulse;
 and wherein the fluid is supplied into the fluid flow path having a constant thickness such that a second shock event through cavitation in the fluid layer occurs upon the collapse of a plasma/vapour bubble generated after the laser pulse striking the target.

The fluid flow path may be arranged such that the thickness of the fluid layer is between about 5 mm and 45 mm, preferably at least about 11 mm.

The laser generating device may be capable of generating a laser pulse of an intensity of between about 0.5 and 100 $GW/cm^2$, preferably about 0.5 and 10 $GW/cm^2$.

The solid medium may be a window or lens, or a combination of a window and lens. In one embodiment of the invention the laser beam incident upon the lens is not focused. In the event that a lens is used it may have a short focal distance such that the transmission losses are kept to a minimum.

The system may include a second window and an evacuated region between the two windows to prevent plasma breakdown of the laser pulse in air before the pulse reaches the window which is in contact with the fluid layer. In this embodiment the evacuated region is preferably about 300 mm in length.

In one embodiment of the system, the fluid flow path may be arranged so that the fluid flow is parallel to a surface of the target being treated in the shock peening process.

The system may further include means for detecting a first bubble oscillation period of the plasma/vapour bubble generated after the laser pulse striking the target. Such means for detecting first bubble oscillation period may also include means for recording the first bubble oscillation period. The first bubble oscillation period of the cavitation event may be related to the energy delivered to the target, thereby enabling a process diagnostic technique.

In accordance with a second aspect of the invention there is provided a method of performing Laser Shock Peeing on a target, the method including the following steps:
 providing a device for generating and transmitting a laser pulse to the target;
 positioning the target in the laser path so that a surface of the target is impacted by the laser pulse;
 locating a solid medium in the laser path which is transparent to incident laser light to allow the laser pulse to pass through it;

supplying a fluid into a fluid flow path arranged between the solid medium and the contact surface of the target so that the fluid is in direct contact with the solid medium and the target to eliminate any air-fluid interface in the travel path of the laser pulse;

creating a fluid layer of a constant thickness so as to induce a second shock event through cavitation in the fluid layer upon the collapse of a plasma/vapour bubble generated after the laser pulse striking the target.

The method may include measuring the bubble energy of the plasma/vapour bubble generated after the laser pulse striking the target The method may include the step of detecting the cavitation in the fluid layer to monitor the power intensity and energy of the laser pulse.

Preferably, the method includes determining a first bubble oscillation period of the plasma\vapour bubble generated after the laser pulse striking the target as a measure of the bubble energy.

The method may also include determining the pressure of the laser pulse exerted on the contact surface of the target by using the plasma bubble energy generated after the laser pulse striking the target.

BRIEF DESCRIPTION OF THE DRAWINGS

The invention will now be described in more detail, by way of example only, with reference to the accompanying drawings in which:

FIG. 5 shows the creation of a primary shockwave and the expansion of a plasma\vapour bubble after the impact of a laser pulse on a contact surface of a target being treated;

FIG. 6 shows the collapse of the plasma\vapour bubble of FIG. 5 and the creation of a secondary shockwave upon the collapse of the bubble;

FIG. 7 shows a sequence of images in which contact between a plasma/vapour bubble emanating from a contact surface of the target and another plasma/vapour bubble emanating from an air/water interface are clearly visible;

EXPERIMENTAL RESULTS

Figure 1:
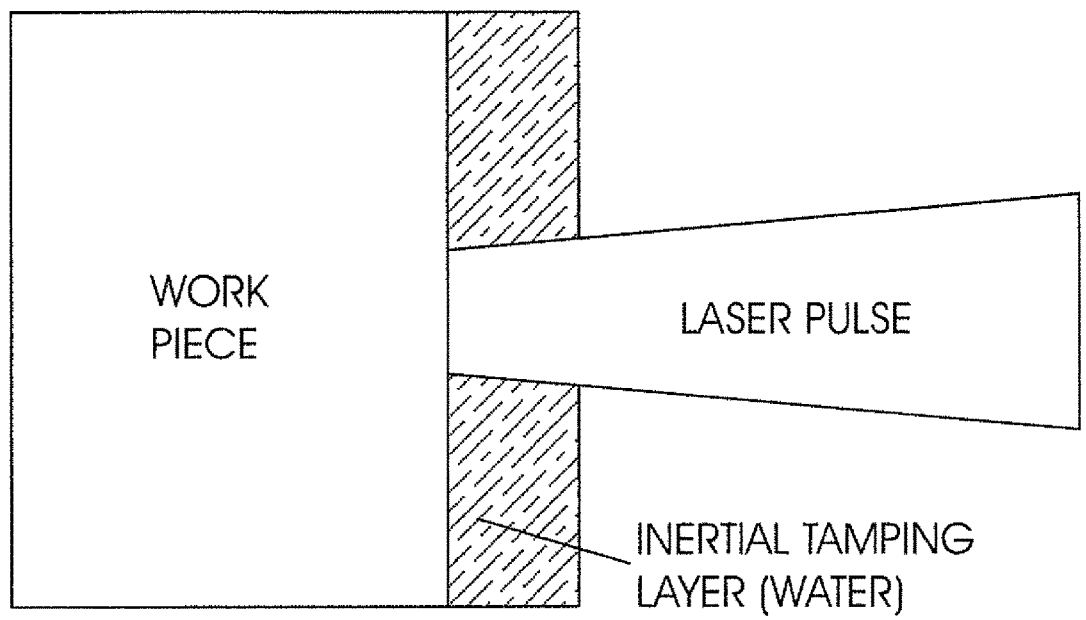
FIG. 1 shows a schematic illustration of a prior art Laser Shot Peening process.
Figure 2:
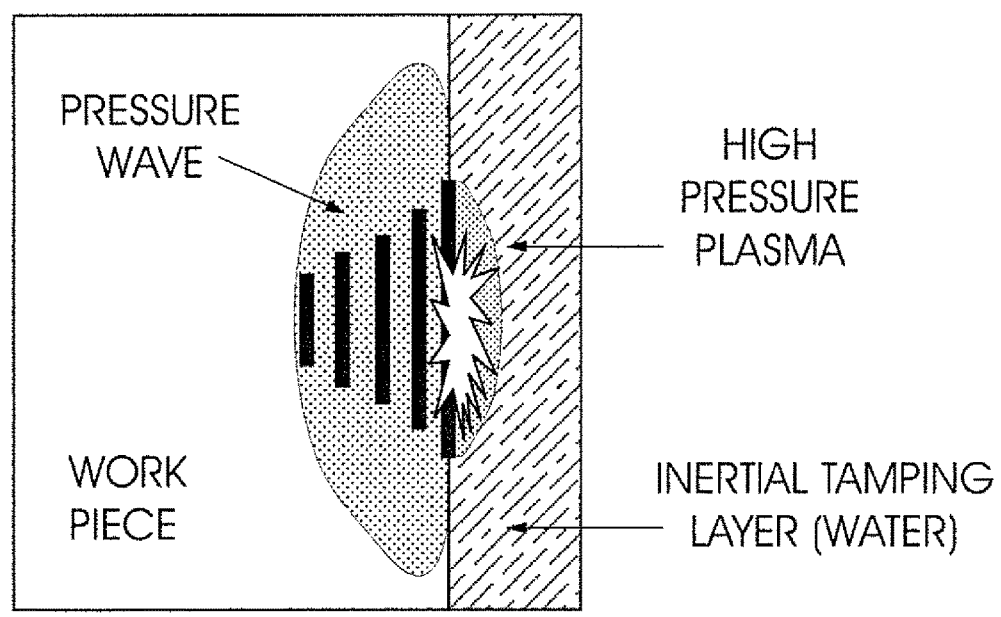
FIG. 2 shows a s schematic illustration of an impact zone where a laser shot impacts a surface of a target or work piece this is being treated in the prior art process of FIG. 1.
Figure 3:
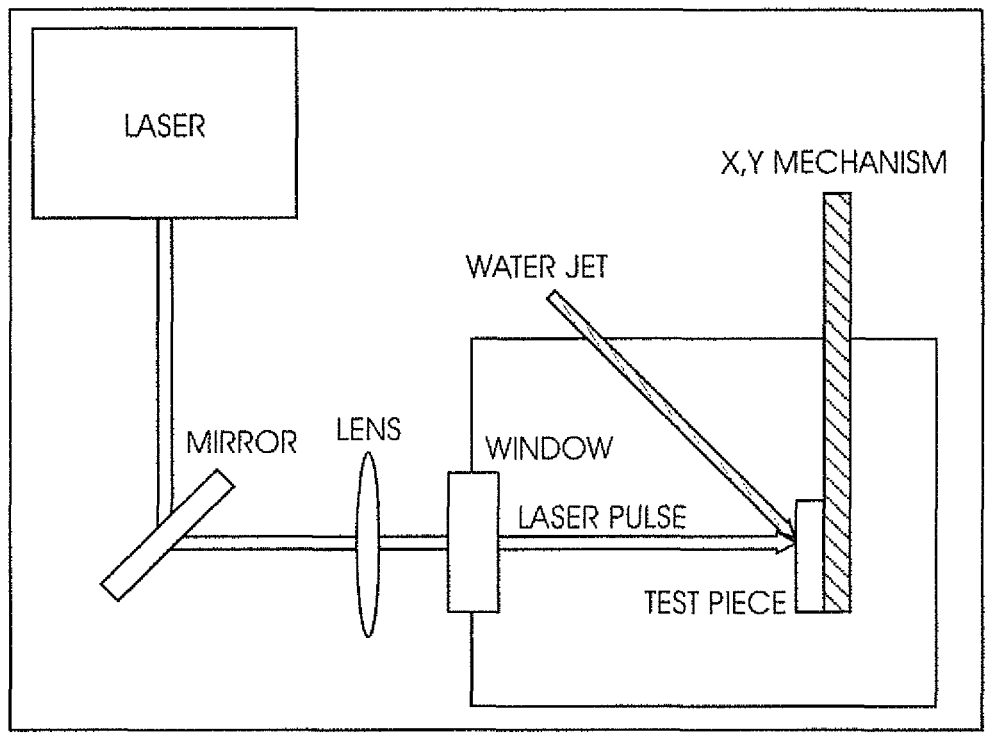
FIG. 3 shows a schematic illustration of a prior art LSP process utilising an indirect ablation mode in which water is used as the confinement medium.
Figure 4:
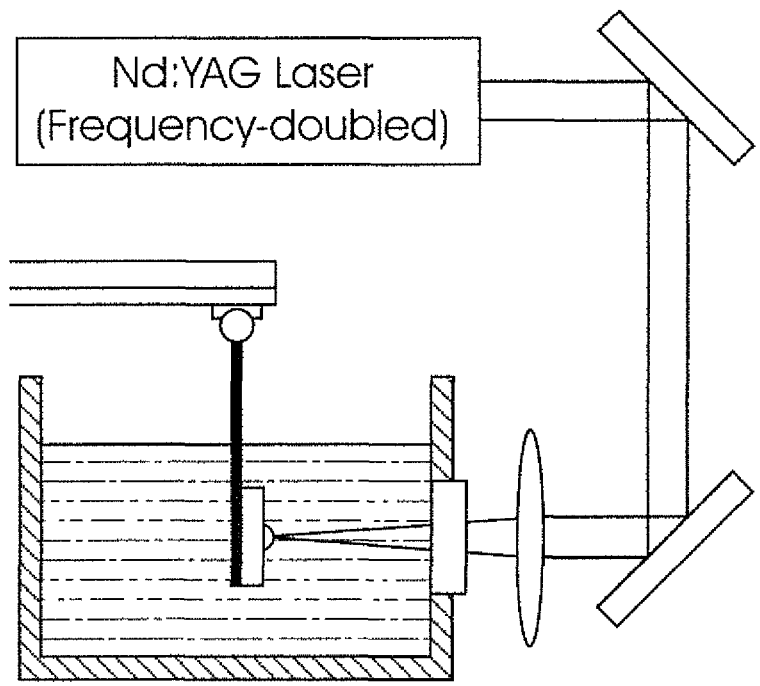
FIG. 4 shows a schematic illustration of a prior art LSP process wherein the target or work piece that is being treated is submerged completely under water.

Generation of a Secondary Shock Event During LSP

The inventors' investigation into a suitable confinement layer thickness for Laser Shock Peeing (LSP) without an ablative coat has led to the observation of cavitation shock phenomena. Such cavitation shock phenomena have been found in various other fields of research but, up until now, laser induced cavitation shocks have not yet been associated with the field of LSP. Experimental trials have been conducted at the South African CSIR National Laser Centre whereby single laser shots at 1064 nm were fired into a static water tank. The tank allowed for a controlled variation of the water layer thickness from 1 mm to 45 mm. A Fastcam SA-5 high-speed camera was used in a Shadowgraph optical configuration to observe the physical shock phenomena that occur within the water layer. Upon laser irradiation the initial or primary shockwave was found to occur as expected, followed by an expansion of a plasma/vapour bubble. The bubble is referred to as a plasma/vapour bubble as it is in the form of plasma for a few nanoseconds and thereafter in the form of vapour. The creation of the primary shockwave and the expansion of the plasma bubble are shown in in FIG. 5, in which the primary shockwave in indicated by the numeral 110 and the plasma bubble by the numeral 112 respectively. During the investigation it was found that, if the water layer was thick enough, the rapid collapse of the plasma vapour bubble 112 on the target surface would result in a strong secondary shock event due to cavitation. The collapse of the plasma vapour bubble 112 and the creation of the secondary shockwave are shown in FIG. 6. In this figure the secondary shockwave is indicated by the numeral 114.

The conditions necessary for the occurrence of this secondary shock event, which is also referred to as a cavitation event, due to the collapse of a plasma/vapour bubble have been established for static water conditions in open atmospheric air at 1064 nm laser light. It has been found that the occurrence of the secondary shock event depends primarily on the water layer thickness as well as the incident power intensity delivered to the target ($GW/cm^2$). During the investigations it was found that no secondary shock event takes place when the following two scenarios occur:
- i) The expanding plasma/vapour bubble erupts through the water layer. This is typically what occurs during conventional LSP processes whereby a thin water layer is applied through a type of water spray jet or nozzle.
- ii) The expanding or collapsing plasma vapour bubble at the target surface makes contact with another plasma/vapour bubble that forms from the water surface at the air/water interface. FIG. 7 shows a sequence of images in which contact between a plasma/vapour bubble 116 emanating from the target surface 118 and another plasma/vapour bubble 120 emanating from the air/water interface 122 are clearly visible.

In FIG. 7 a laser shot is fired through a water layer 124 having a thickness of about 15 mm. After the first or primary shock event, which is evident by image blurring in the first three images, the plasma/vapour bubble 116 grows from the target surface 118 which in these images is the lower black band. Once this plasma/vapour bubble 116 begins to contract, another plasma/vapour bubble 120 originates at the water surface 122 which is seen at the upper black band. As the two bubbles 116, 120 from the target and water surface coalesce, the energy within the target surface bubble 116 is released, and, therefore, upon its collapse there is no secondary shock event or cavitation event.

The conditions necessary for the generation of a secondary shock event upon the collapse of the target surface plasma/vapour bubble are illustrated in FIG. 7. Each data point represents experimental observations for a controlled water layer thickness and power intensity (in $GW/cm^2$). The occurrence or non-occurrence of a secondary shock event is represented by the type of data point as indicated by the key in FIG. 8. The occurrence or non-occurrence of a secondary shock or cavitation event was determined by visual observation through a Shadowgraph optical configuration which allows for observation of shock phenomena through changes in image density gradient.

Figure 8:
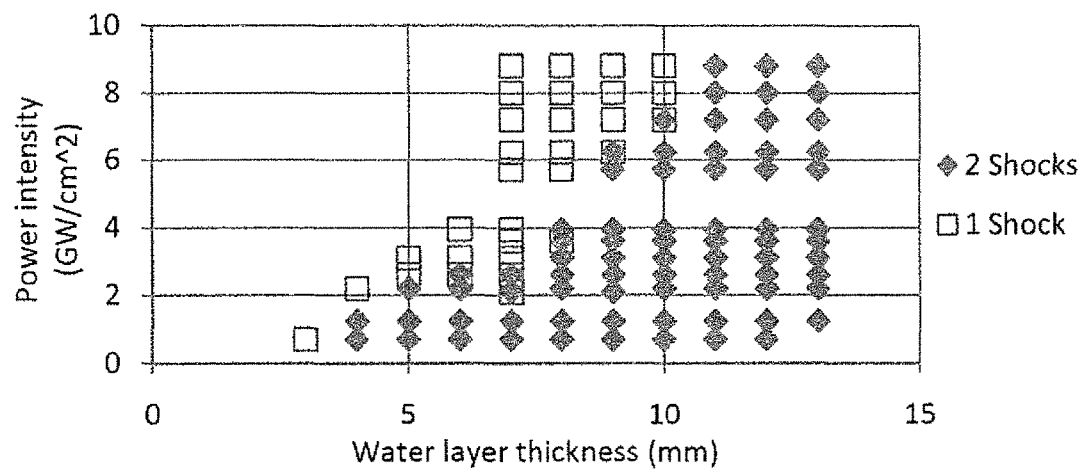
FIG. 8 shows experimental data of water layer thicknesses at which a secondary shockwave was detected during the experimental investigation.

From FIG. 8 it is clear that the water layer thickness is an important parameter that can dictate the occurrence or non-occurrence of a secondary shock event after a laser pulse. The typical range of power intensities employed during LSP are from 1 to 10 $GW/cm^2$ and FIG. 8 clearly shows that, for this range of power intensities, a secondary shock event shall occur when the water layer is greater than 11 or 12 mm under these static testing conditions when using a laser pulse of 1.7 J. However, when using more powerful laser pulses this water layer thickness is expected to increase.

This observation may hold beneficial implications to the field of LSP and, as a result, invention according to the invention is concerned with the precise control of the water layer. The invention is specifically concerned with a system for carrying out a LSP process which ensures that a secondary shock event occurs for both static and dynamic conditions, i.e. when the water layer is created by a continuous flow of water.

First Bubble Oscillation Period

The plasma/vapour bubble generated after the firing of a high intensity laser pulse at the target covered by a sufficiently thick water layer will first expand and then collapse in the particular conditions described above. As mentioned above, the collapse of the plasma/vapour bubble may also be referred to as a cavitation event, and is associated with the generation of a high magnitude pressure sufficient to result in shock generation through both the target material and water confinement layer. It must be understood that after a single laser pulse, the growth and collapse of the plasma/vapour bubble results in a secondary shock event. This plasma/vapour bubble typically continues to expand and contract sequentially and rebound in what is referred to as bubble oscillations. The time duration of the first bubble expansion and contraction is referred to as the first bubble oscillation period. As mentioned above, upon laser irradiation an initial or primary shockwave will be generated as expected in an LSP process. Then, depending on the water confinement configuration the cavitation event may result in an additional or secondary shock event. The attributes of the plasma/vapour bubble generated by this secondary shock event depend on various aspects such as bubble energy, media density, media specific heats, water pressures and other boundary conditions such as the presence of a surface, for example. In terms of the secondary plasma/vapour bubble behaviour, both the size and duration of each bubble oscillation are directly related to the bubble energy.

The fact that the first bubble oscillation period is directly related to the bubble energy is of some significance to the LSP process. This first bubble oscillation period may therefore be a direct indicator of laser-material interaction efficiency. The inventors therefore identified the need to conduct investigations into the significance of the first bubble oscillation period, as this is a quality that is simple to quantify using a wide range of possible measurement techniques.

Some challenges involved in the reliable and repeatable treatment of LSP are due to unaccounted energy losses, i.e. the lack of control or knowledge of actual energy delivered to the target surface. In view of the fact that the initial pressure pulse responsible for the laser shock peening affect is also directly related to the actual energy delivered to the target surface, the first bubble oscillation period may provide valuable information pertaining to the pressures generated during the LSP process. Typically, unaccountable losses include the occurrence of breakdown phenomena or even damage of laser optics, which is inevitable as laser optics are consumable items. Contamination of the air or water during the LSP process may further reduce the dielectric threshold of the medium through which the laser beam propagates before irradiating the intended target. In such a case where losses occur through contamination of propagation medium, for example, the detection of such losses during the LSP process would be difficult to monitor. However, if there is the occurrence of a cavitation event or secondary shock event, the monitoring of the first bubble oscillation period may be a simple method for gaining information about the actual energy delivered during each laser pulse.

The experimental investigation conducted by the inventors, was aimed at determining the relation of the first bubble oscillation period to the energy delivered to the target during the LSP process. This investigation involved a visual observation of physical shock phenomena, i.e. the first and second shocks generated, through a Shadowgraph optical configuration utilising high speed imaging techniques. During the investigation, various water layer configurations were used in a static water tank while the power intensity of the laser pulse delivered to the target was controlled. The first bubble oscillation periods for the different configurations and power intensities were then recorded. Again, the range of power intensities used in the investigation was the same as those of a typical LSP process, i.e. 1 to 10 $GW/cm^2$.

Figure 9:
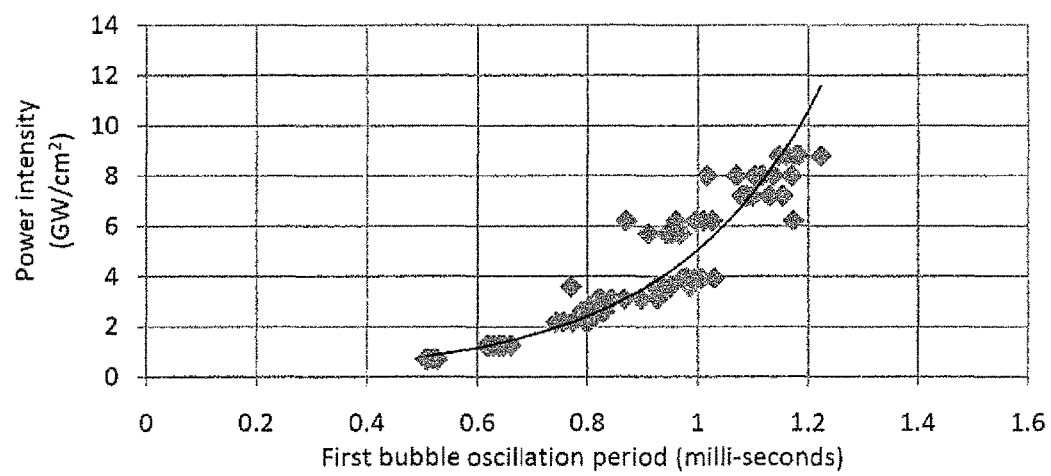
FIG. 9 illustrates the results of the first bubble oscillation period obtained during the experimental investigation for a water layer thickness of 15 mm.
Figure 10:
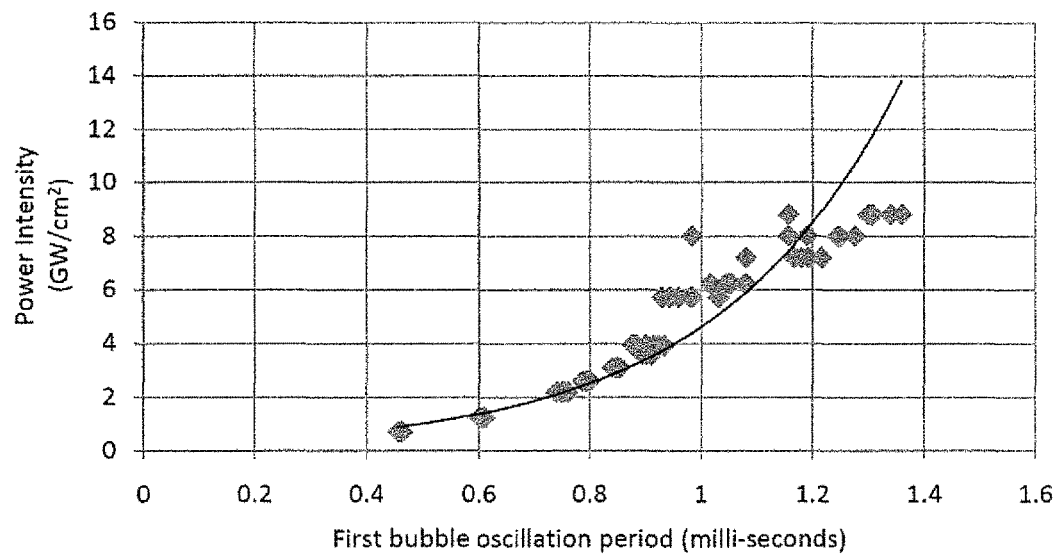
FIG. 10 illustrates the results of the first bubble oscillation period obtained during the experimental investigation for a water layer thickness of 30 mm.
Figure 11:
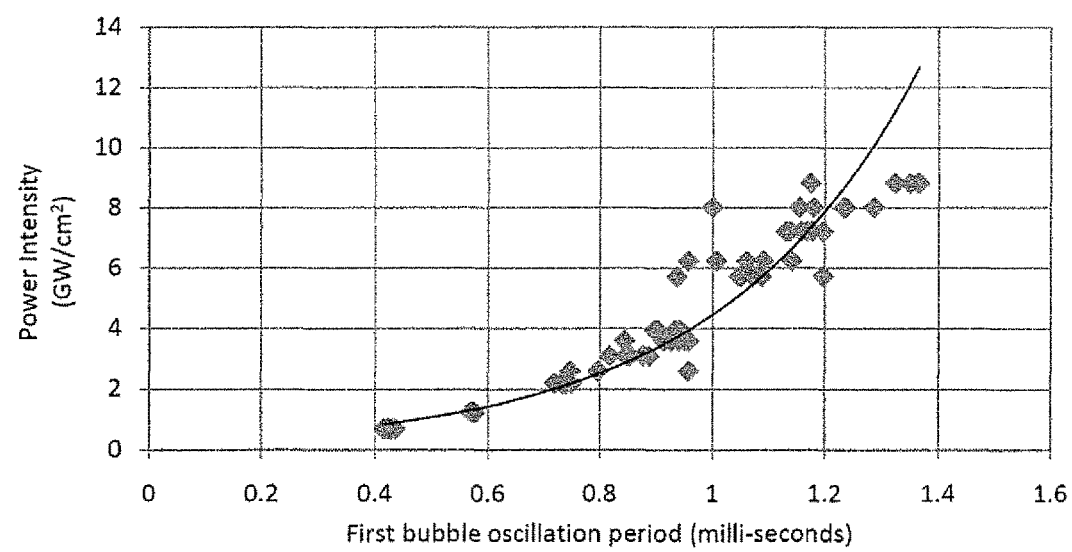
FIG. 11 illustrates the results of the first bubble oscillation period obtained during the experimental investigation for a water layer thickness of 45 mm.

FIGS. 9 to 11 illustrate the results obtained during the investigation for water layer thicknesses of 15 mm, 30 mm, and 45 mm respectively. Three different water layers were tested in order to determine the extent of the losses through a specified thickness of water. In FIGS. 9 to 11, which illustrate the results for the 15 mm, 30 mm, and 45 mm tests respectively, an exponential trend line has been plotted as the variation in bubble period with internal energy is expected to vary according to an exponential law. It should be noted that although the first bubble oscillation period will vary with internal energy, the power intensities of the laser pulses were considered during the experimental investigations. Power intensity is a dominant parameter during the LSP process, and essentially will determine the extent of surface and water vaporization from which the plasma/vapour bubble is generated and, accordingly, is an indication of the internal energy. In FIGS. 9 to 11, each power intensity tested is represented by six data points. From these figures it can be seen that the six data points for each power intensity generally overlap for lower power intensities, i.e. between 0.5 and 3.5 $GW/cm^2$, and scatter for higher power intensities, i.e. 3.5 and 10 $GW/cm^2$.

Figure 12:
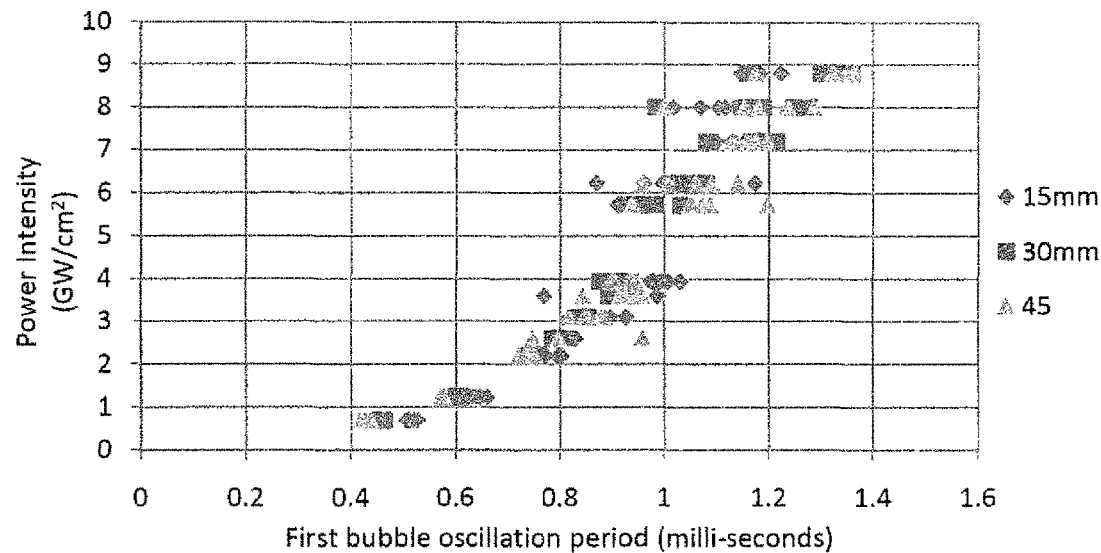
FIG. 12 illustrates the combined results shown in FIGS. 9 to 11.
Figure 13:
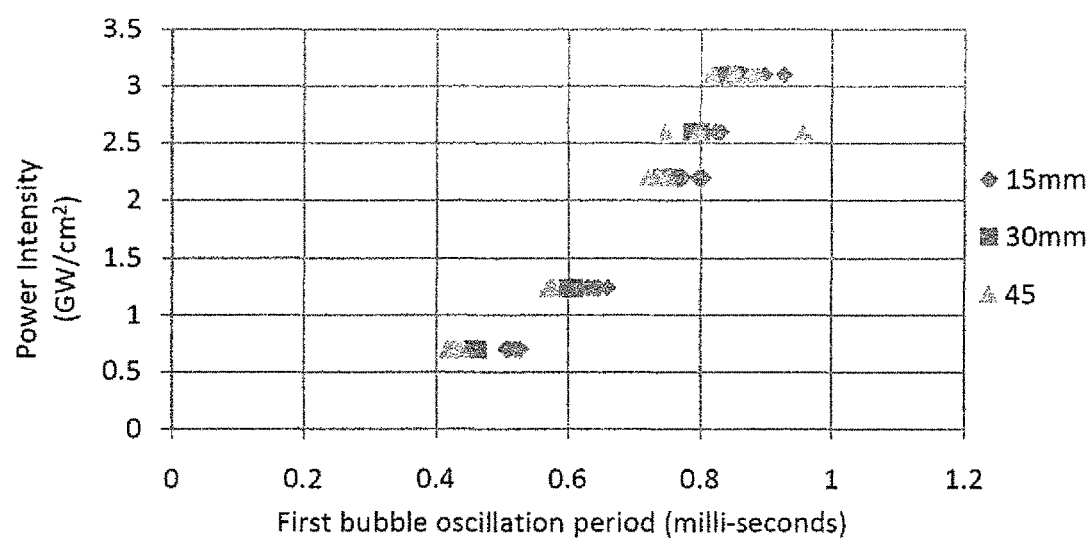
FIG. 13 shows an enlarged with of FIG. 13 so as to focus on the range of power intensities of up to 3.1 GW/cm$^2$.

All of the data points of FIGS. 9 to 11 are combined into a single graph illustrated in FIG. 12 so that the data points for the three different water layer thicknesses are illustrated in a single graph. FIG. 13 focuses on the range of power intensities of up to 3.1 $GW/cm^2$ only. Considering the six different data points for each power intensity, it can be seen from FIG. 13 that the repeatability for the low power intensities of between 0 and about 3.5, particularly 3.1 $GW/cm^2$, is far greater than the repeatability for higher power intensities.

Although the expected trend is apparent for the first bubble oscillation period in relation to power intensity, there is a large degree of deviation especially at higher power intensities. These deviations can be attributed to observed dielectric breakdown. As mentioned above these experiments there were no laser window used to confine the water layer and, accordingly, dielectric breakdown occurred at the air/water interface.

Figure 14:
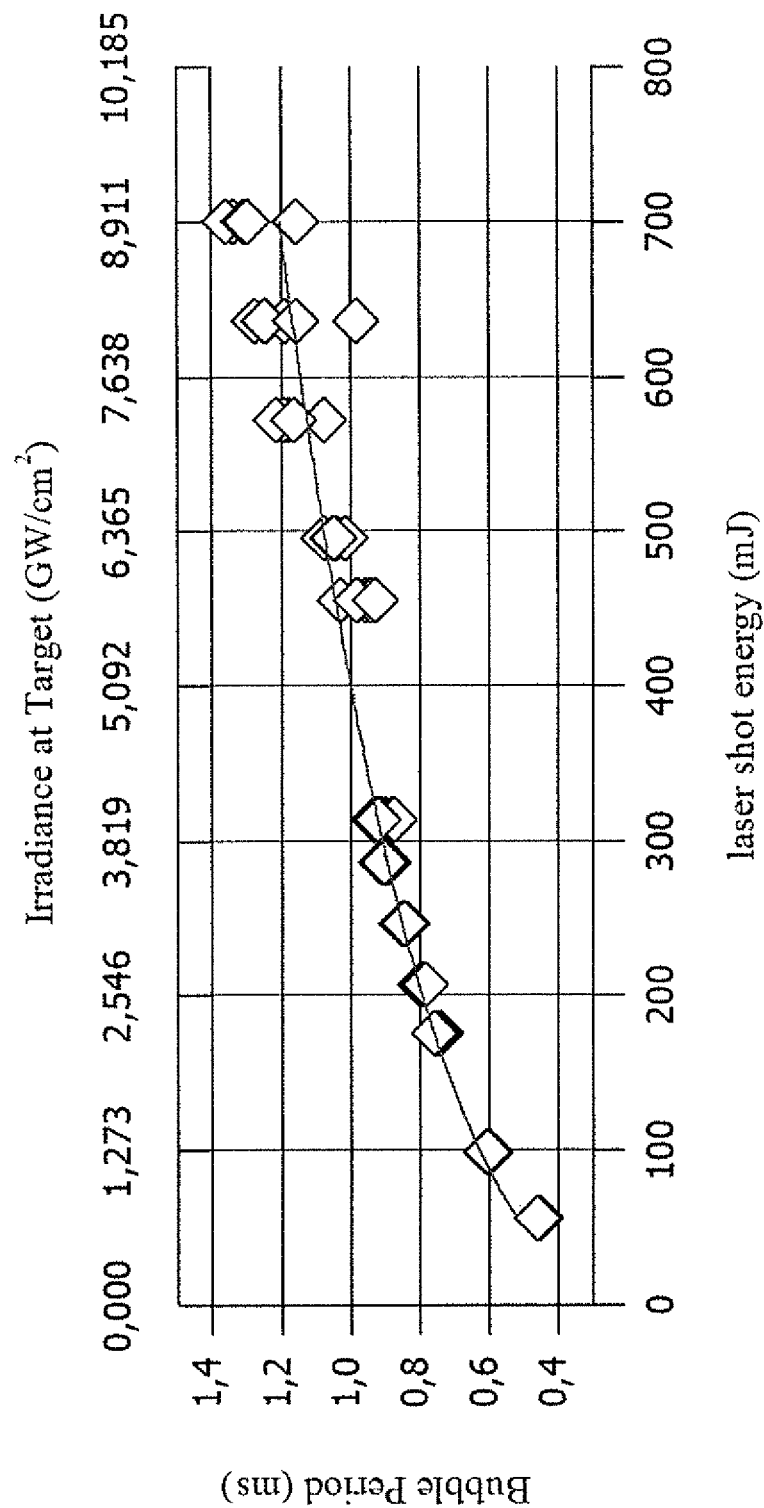
FIG. 14 illustrates another representation of the data of FIG. 11 in which the first bubble oscillation periods for various energy single laser shots using a 30 mm water layer can be seen.

FIG. 14 again illustrates the first bubble oscillation periods for various energy single laser shots using a 30 mm water layer. The data represented in FIG. 14 is the same data represented in FIG. 11.

Since the incident laser energy is partitioned into various mechanisms, such as primary shockwave energy, cavitation bubble energy and spectral emission, only a fraction of the incident laser energy is converted into bubble energy. If it is assumed that a constant portion of incident laser energy is converted into bubble energy, then the fraction of bubble energy from the incident pulse can be estimated. When representing bubble energy as a fraction of laser energy and fitting a curve to the data of FIG. 6, it has been found that the best fit converges for a factor of 0.32 of laser energy conversion into bubble energy.

It is envisaged that by using the system and method of performing LSP in accordance with the invention the same repeatability for power intensities of up to about 3.8 $GW/cm^2$ could be obtained for much higher power intensities as a result of the elimination of the air/water interface. From the results illustrated in FIG. 6 the inventors identified that by measuring the first bubble oscillation period the scatter in data can be detected so as to determine whether any breakdown events occur in the LSP process. The first bubble oscillation period could therefore be a valuable tool in developing a process diagnostic.

Dielectric Breakdown within the LSP Process

R. Fabbro et al.: J. Appl. Phys. 68, 775-784 (1990) have previously mentioned that a breakdown phenomenon, which is undesirable due to unpredictable and unreliable energy delivery to the target, initiate first at the water surface, i.e. the air/water interface, during the LSP process. During their brief investigation, plasma formation at the water surface was first observed for 1064 nm laser light at around 2 $GW/cm^2$.

Figure 15:
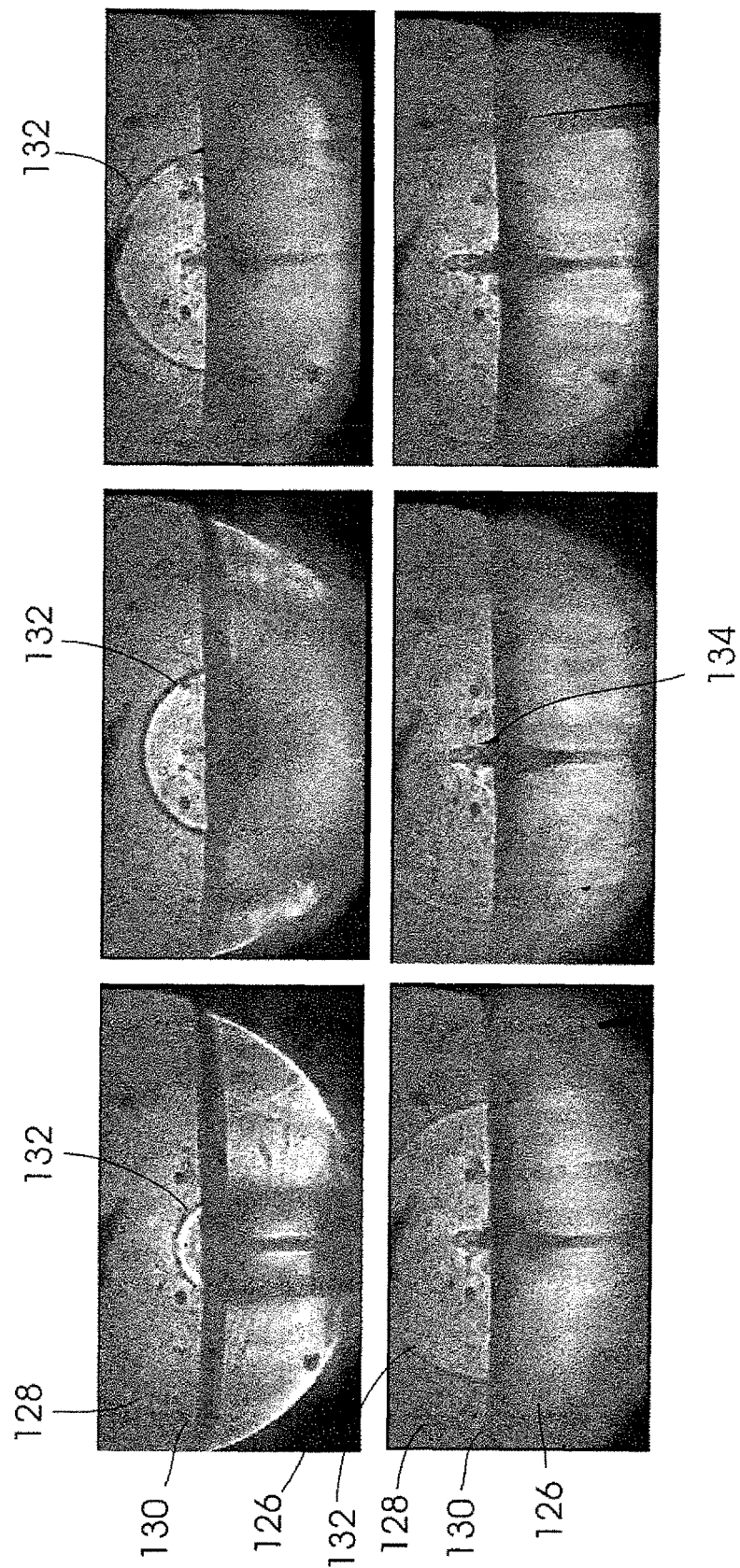
FIG. 15 illustrates plasma generation at the air/water interface in which the propagation of a shockwave is evident due to the Shadowgraphy observation technique used during the experimental investigation.

During the experimental investigations the inventors made similar findings through the visual observation of the shock phenomena required for determination of the first bubble oscillation period. FIG. 15 is a depiction of plasma generation at the air/water interface, whereby a propagation of a shockwave is evident due to the Shadowgraphy observation technique used. In FIG. 15 the water layer and air are indicated by the numerals 126 and 128 respectively, whereas the air/water interface is indicated by the numeral 130. In the range of representations of FIG. 15 the propagation of the shockwave 132 and generation of the plasma 134 are clearly visible.

The formation of plasma and the resulting shock wave reduce the amount of energy that is deliverable to the target surface and as a result reduce the first bubble oscillation period. Dielectric breakdown events are known stochastic occurrences, and essentially are the direct reason for the large deviations found in the relation of first bubble oscillation periods with power intensity as represented by the scatter of the data points in FIGS. 9 to 14.

Figure 16:
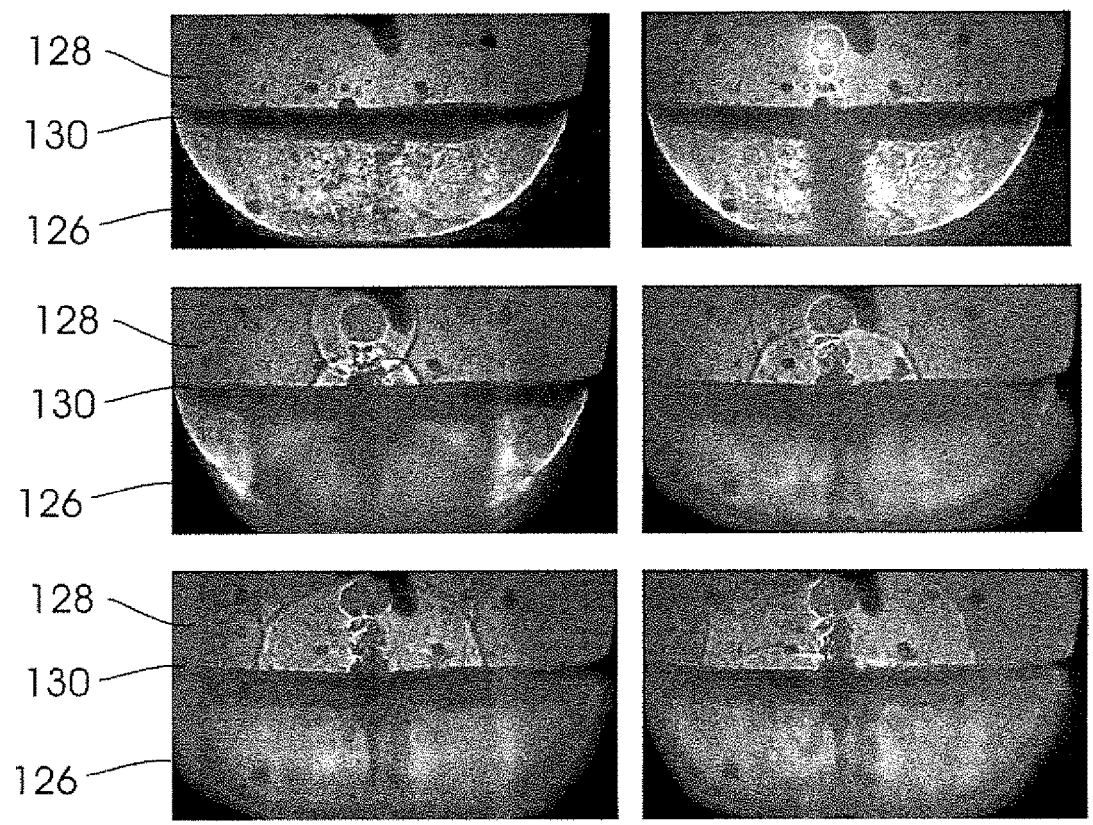
FIG. 16 illustrates the plasma generation from a second laser pulse shot 0.1 seconds after that laser shot illustrated in FIG. 15.
Figure 17:
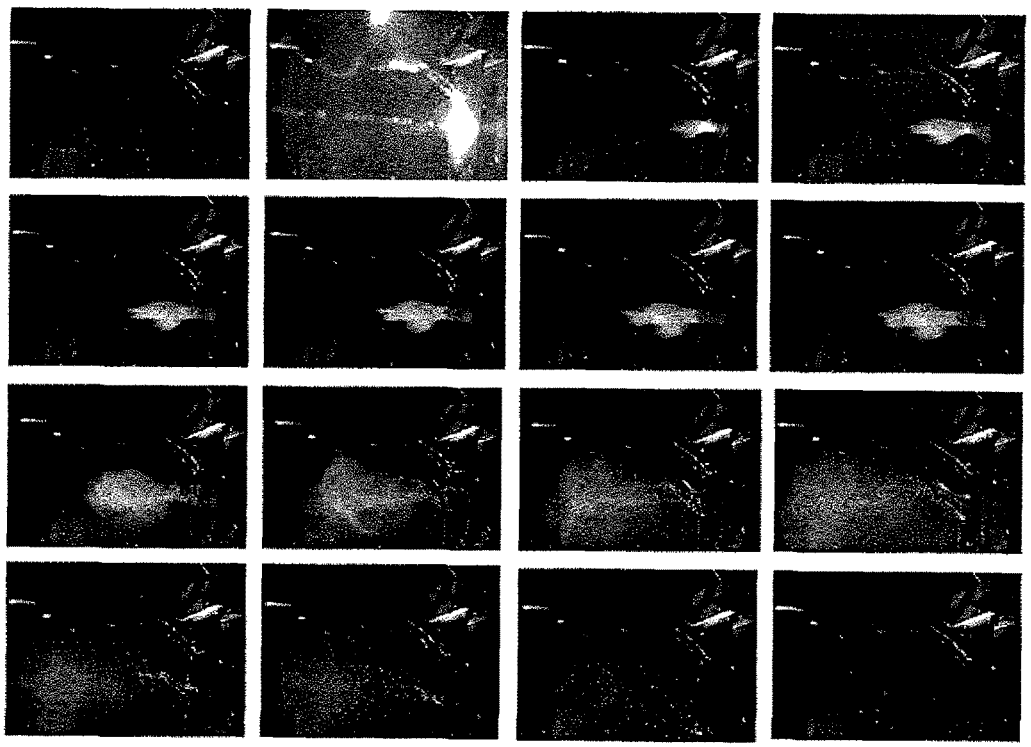
FIG. 17 shows a sequence of photographs illustrating the water droplet ejections during a typical LSP process using a thin water layer of about 0.8 mm.

It should be noted that the images of FIG. 15 as well as data points obtained for the first bubble oscillation periods of FIGS. 9 to 14 were obtained through the firing of a single laser pulse. The investigation was then expanded to include events whereby the laser is operated on repetition seeing that an industrial LSP process will employ the sequential firing of laser shots at a target for coverage of large treatment areas. FIG. 16 is a depiction of plasma generation from a second laser pulse shot 0.1 seconds after that laser shot of FIG. 14 above, i.e. at a laser repetition rate of 10 Hz. The experimental conditions of FIG. 16 were identical to FIG. 15 in view of the fact that the images of these two figures were obtained in the same test. Therefore, like reference numerals indicate like features in FIGS. 15 and 16.

From the FIG. 16 it is clear that air breakdown occurs before the air/water interface 130 as was seen for single laser shots in FIG. 15. The reason this breakdown is due to atomised water droplets that are ejected out to the atmosphere after the pressure pulse generated by each laser shot. These small water droplets act as breakdown initiation sites due to absorption of high laser intensities. This is a significant concern for an industrial LSP process as the laser is typically operated on repetition mode, whereby a thin water layer is typically employed and water ejections are far more severe than those of the configuration of FIGS. 15 and 16, which included a water layer having a thickness of about 15 mm.

Figure 18:
FIG. 18 shows the water layer disruption resulting from the pressure pulse generated by a laser pulse striking the target in the process of FIG. 17, at which time the target is not sufficiently covered with water.

In order to observe the water droplet ejections during a typical LSP process, high speed photography was used to capture the results when a laser is operated at 10 Hz at 1064 nm and a thin water layer of about 0.8 mm is employed. Although the image sequence shown in FIG. 16 shows that there are no large water droplets present before the next laser shot hits the target in 0.1 seconds, a very fine mist in the form of atomized water droplets can be observed from the actual video. An important feature which is evident from this high speed imaging is that there is a distinct time required for the recovery of the thin water layer, which was applied through a water spray nozzle. As mentioned above, this time duration until the target area is sufficiently covered with a uniform and laminar water layer thickness is significant, as this essentially limits the repetition rate operable during the LSP process. FIG. 18 shows the water layer disruption resulting from the pressure pulse generated by a laser pulse striking the target. At the moment at which FIG. 18 was taken the target is not sufficiently covered with water.

Description of the Illustrated Embodiments

Referring to the drawings, in which like numerals indicate like features, a non-limiting example of a system for performing Laser Shock Peeing (LSP) on a target in accordance with a first embodiment of the invention is generally indicated by reference numeral 10.

The system 10 has specifically been developed in the effort to induce a strong secondary shockwave or cavitation event by imposing a thick fluid layer over a surface 102 of a component being treated in the LSP process.

Figure 19:
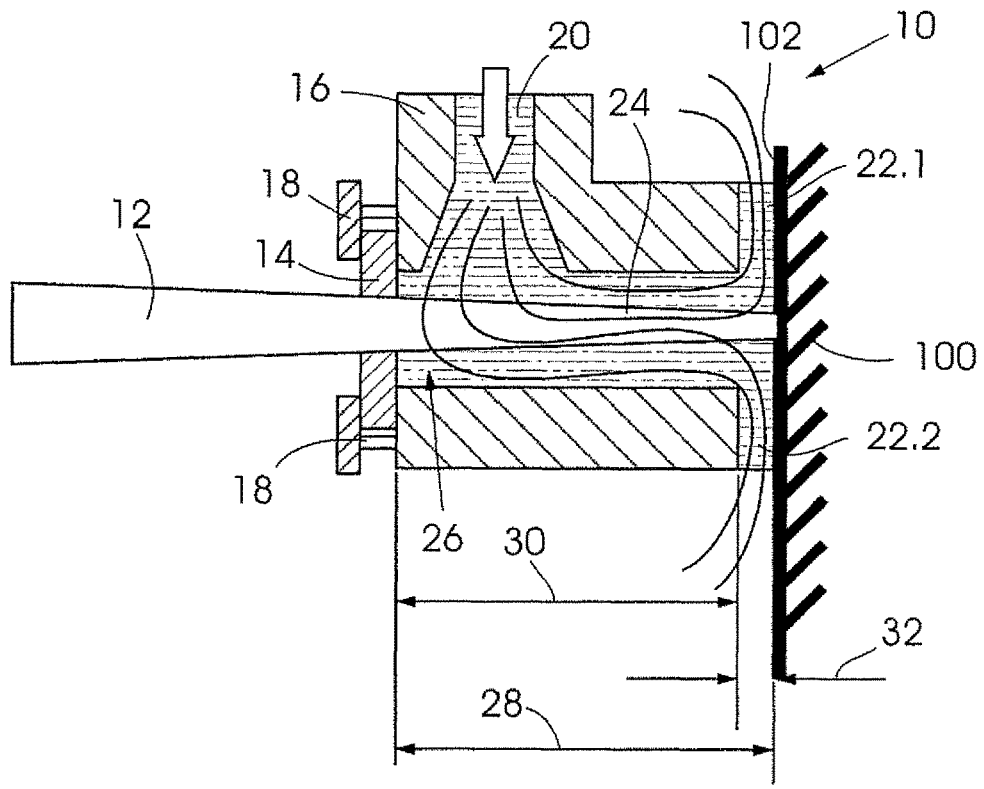
FIG. 19 shows a system in accordance with a first embodiment of the invention for performing Laser Shock Peeing on a target.

The system 10 includes a device for generating and transmitting a laser pulse to the target, which is indicated in FIG. 19 by the numeral 100. The device for generating and transmitting a laser pulse is not illustrated in FIG. 19 but is typically a laser capable of transmitting laser pulses, such as 1064 and 532 nm pulses, for example. In use, the laser would typically deliver a continues stream of laser pulses so as to create a laser beam, which is indicated by the numeral 12 in FIG. 19. The laser generating device is capable of generating a laser pulse having an intensity of between about 0.5 and 100 GW/cm$^2$, particularly between about 0.5 and 10 GW/cm$^2$.

The laser beam 12, in use, passes through a solid medium 14 which is transparent to incident laser light. In the illustrated embodiment of FIG. 19 the solid medium 14 is in the form of a laser window which is connected to a body 16 by means of fasteners 18. The fasteners 18 allow the laser window 14 to be replaced when required.

The system 10 further includes a fluid source (not shown in the accompanying drawings) for supplying a fluid, preferably water, to the surface 102 of the component being treated in the LSP process. In the preferred embodiment the fluid is in the form of water so as to create a water layer over the region of the surface 102 of the component 100 that is being treated. The water is typically fed or supplied into the body 16 of the system 10 through an inlet 20 and dispensed from the body through at least one outlet. In the embodiment of FIG. 18, the system 10 has two outlets 22.1 and 22.2 which are, in use, top and bottom outlets. From FIG. 19 it must be clear that the outlets 22.1 and 22.2 are simply in the form of passages created between the surface 102 of the component 100 and the body 16. The size of the outlets 22.1 and 22.2 is therefore controllable by moving the body 16 of the system towards and away from the component 100 and in particular its surface 102.

Referring still to FIG. 19 it can be seen that a fluid flow path 24 arranged between the inlet 20 and the outlets 22.1 and 22.2. The fluid flow path 24 runs through a fluid chamber 26 which is formed in the body 16 of the system 10. The fluid chamber 26 and, accordingly, at least a portion of the fluid flow path 24 are sandwiched between the laser window 14 and the surface 102 of the target or component 100 so that, in use, during the laser shock peening process the water is in direct contact with the laser window and the surface 102 of the component being treated. It must be clear that this arrangement or configuration eliminates any air/water interfaces in the travel path of the laser pulses i.e. the laser beam 12, thereby reducing dielectric breakdown of the laser beam 12.

In use, water is supplied into the fluid flow path 24 and fluid chamber 26 which creates a water layer having a constant thickness over the region of the surface 102 that is being treated so as to induce a secondary shock event through cavitation in the fluid layer upon the collapse of a plasma bubble generated after the laser pulse striking the target. From the description of the experimental results discussed above, it must be clear the water layer must be of sufficient thickness in order to ensure that a secondary shockwave takes place. Based on the experimental results the inventors have identified that a thickness of the water layer of at about 5 mm, preferably at least about 10 mm, would induce a secondary shockwave.

In the embodiment of the system 10 illustrated in FIG. 19 the thickness of the water layer is determined from the end of the body 16 which is, in use, farthest away from the target or component 100 to the contact surface 102 of the component. The numeral 28 in FIG. 19 denotes the thickness of the water layer. In this particular embodiment of the system, the water layer thickness is determined by the length 30 of the fluid chamber 26 and the length of the gap 32 between the end of the body 16 and the contact surface 102 of the component 100 being treated. The thickness of the water layer is therefore adjustable and has a minimum thickness which is equal to the length 30 of the fluid chamber 26. The maximum water layer thickness is determined by the length of the gap 32 between the body 16 and the contact surface 102 of the component 100. In order to obtain the desired water flow rate through the fluid flow path 24 the gap length 32 between the body 16 and the contact surface 102 of the component 100 will typically be in the range of 0.1 to 10 millimeters.

In use, the laser beam 12 propagates through the laser window 14 and the fluid chamber 26. Water is pumped through the fluid chamber 26 and is dispensed through the gap between the body 16 of the system 10 and the contact surface 102 of the target or component 100. Essentially there will be no air between the laser window 14 and the target 100, but only water. In view of the fact that all of the interfaces through which the laser beam 12 propagates are stable, beam scattering will be eliminated.

Figure 20:
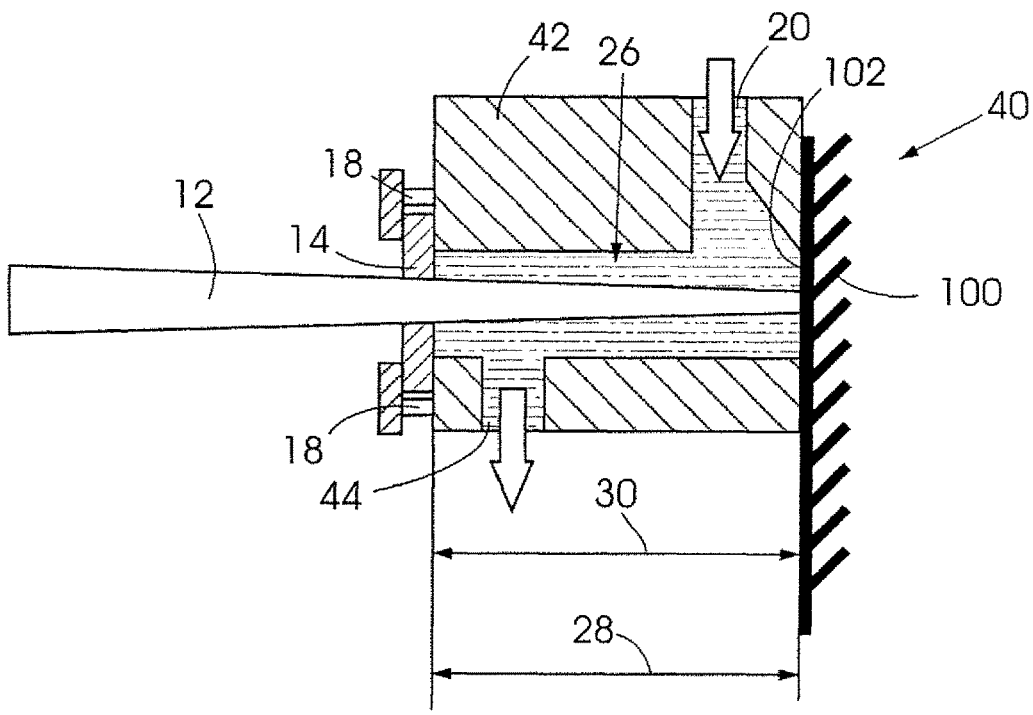
FIG. 20 shows a system in accordance with a second embodiment of the invention for performing Laser Shock Peeing on a target.

Another embodiment of the system according to the invention is illustrated in FIG. 20 in which it is indicated by the reference numeral 40. The system 40 according to the second embodiment is similar to the system 10 and like numerals indicate like features in the accompanying drawings. The main difference between the first and second embodiments is that the water outlet of the second embodiment is not located at the contact surface 102 of the component 100 that is, in use, being treated. From FIG. 19 it can be seen that the system 40 has a body 42 which defines a single outlet 44 through which water is, in use, dispensed. In this second embodiment of the system 40 the water layer thickness 28 is substantially equal to the length 30 of the fluid chamber 26.

Figure 21:
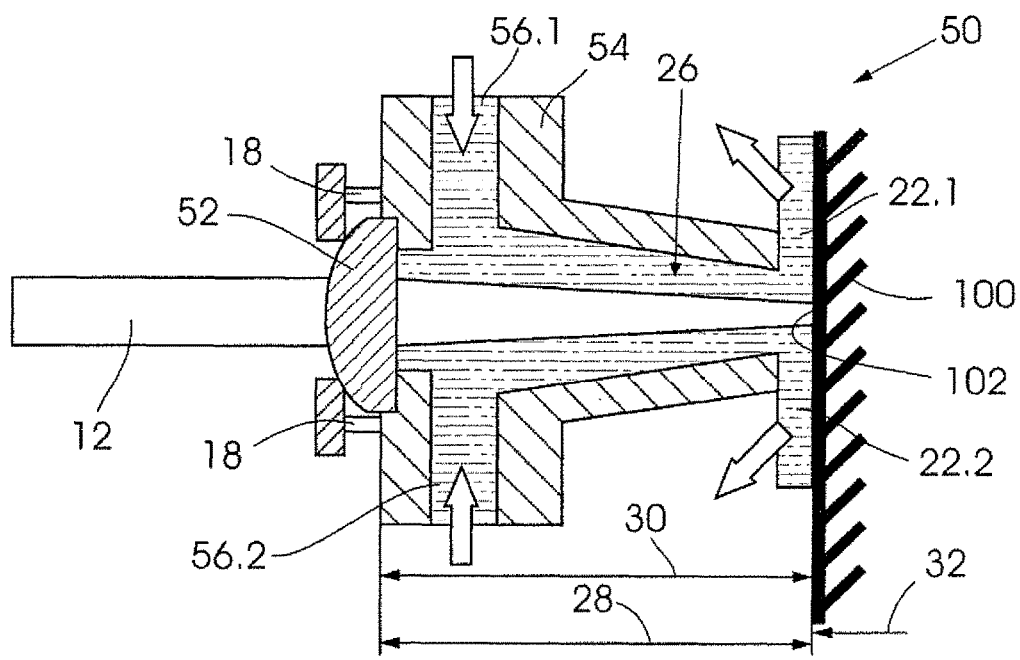
FIG. 21 shows a system in accordance with a third embodiment of the invention for performing Laser Shock Peeing on a target.

Yet another embodiment of the system according to the invention is illustrated in FIG. 21 in which it is indicated by the reference numeral 50. The system 50 according to the second embodiment is again similar to the system 10 and, again, like numerals indicate like features.

In this third embodiment of the system 50 the laser window is replaced by a lens 52. When using a laser window such as in the first and second embodiments of the system, the water cavity 26 needs to be long enough such that the focused beam incident on the laser window does not exceed its damage threshold. However, it has been found that it more desirable to keep the water cavity length 30 as short as possible, yet sufficient to obtain a secondary shockwave or cavitation event, in order to minimise water transmission losses. Therefore, the configuration of the third embodiment of the system 50 as illustrated in FIG. 21, addresses the problem of water transmission losses seeing that the laser beam incident upon the lens 52 is not focused and therefore less prone to damage. As a result, the configuration of the system 50 allows it to utilise a lens 52 with a short focal distance such that the water cavity length 30 and, accordingly, the transmission losses are kept to a minimum.

In this third embodiment the system 50 includes a body 54 defines two inlets 56.1 and 56.2 feeding water into the fluid chamber 26. From FIG. 21 it can be seen that the fluid inlets 56.1 and 56.2 are located on opposite sides of the fluid chamber 26. It is envisaged that the water inlets 56.1 and 56.2 could be located radially opposite one another in the body 26.

Yet a further embodiment of the system according to the invention is illustrated in FIG. 21 in which it is indicated by the reference numeral 60. Again, like numerals indicate like features.

Figure 22:
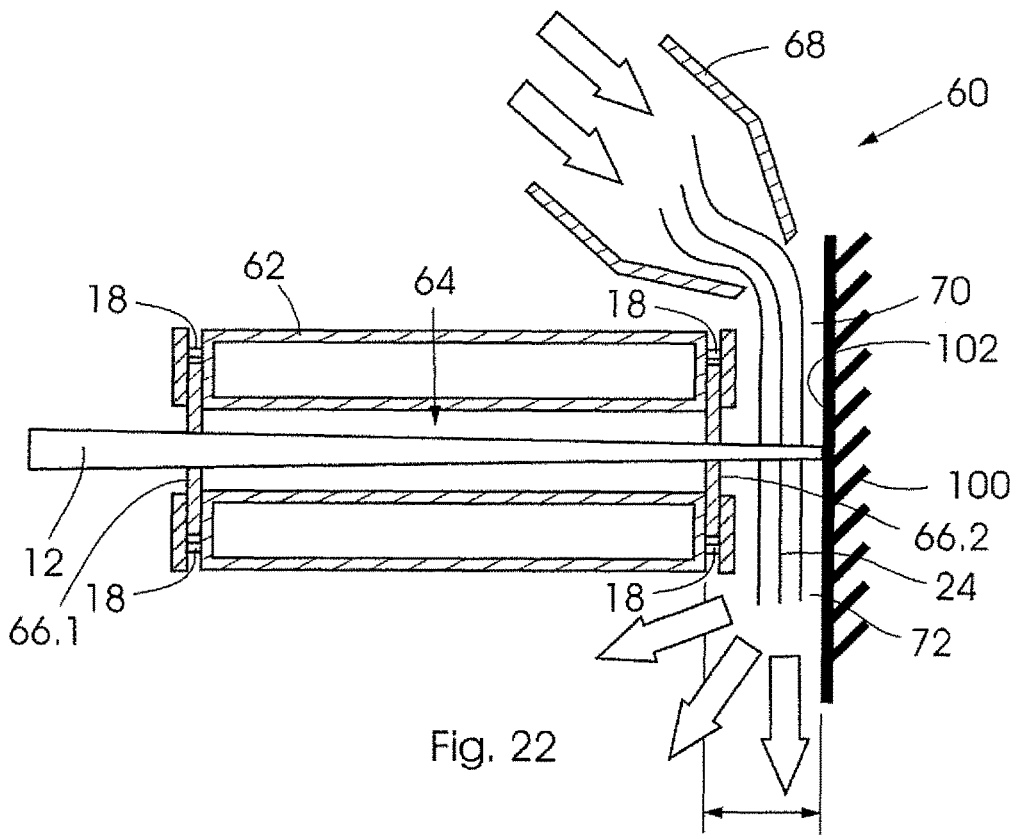
FIG. 22 shows a system in accordance with a fourth embodiment of the invention for performing Laser Shock Peeing on a target.

The system 60 in accordance with this fourth embodiment of the invention includes a body 62 which defines an internal cavity 64. As shown in FIG. 22, the internal cavity 64 is provided between two laser windows 66.1 and 66.2 which are located in the end regions of the body 62. An evacuated region is created between the two high power laser windows 66.1 and 66.1 in an attempt to prevent plasma breakdown of the laser pulse in air before reaches the window 66.2 which is, in use, in contact with the water layer. During the experimental investigations the inventors identified that air breakdown typically occurred around 50 to 100 mm from the target. Accordingly, an evacuated region of about 300 mm in length was used during the testing of this fourth embodiment of the system 60. The evacuated region may also be referred to as a vacuum chamber and could be evacuated with air, or filled with another gas such as nitrogen and then evacuated.

In FIG. 22 is can be seen that the fluid flow path is arranged so that the fluid flow is substantially parallel to the contact surface 102 of the target 100 that is, in use, being treated in the LSP process. In the system 60 the water is delivered to the fluid flow path by means of a nozzle 68 located in close proximity to an inlet 70. Due to the fluid flow path being substantially parallel with the contact surface 102 of the component 100 the inlet 70 is in line with an outlet 72 through which the water is, in use, dispensed. The inlet 70 and outlet 72 are accordingly of substantially equal size. Similarly to the system 10 in accordance with the first embodiment of the invention the size of the outlet 72, and therefore the inlet 70, is adjustable by moving the body 62 towards and away from the surface 102 of the component 100. It must be understood that by changing the length of the gap between body 62 and the contact surface 102 of the component 100 the thickness of the water layer through which the laser beam 12 propagates is adjusted. The thickness of the water layer is again illustrated by the reference numeral 28 and is defined as the distance between the laser window 66.2 and the contact surface 102 of the component 100. It has been found that a water layer thickness 28 of between about 5 mm and about 10 mm resulted in a secondary shock event occurring.

The primary contributing factors to air breakdown of the laser beam 12 are firstly power intensity, and secondly the air characteristics such as pressure, quality and humidity, for example. The air quality is typically determined by the quantity of dust particulate or water droplets present therein. During the experimental investigations it was initially assumed that the power intensity was well controlled as energy input, spot size, and pulse duration were quantified. Therefore, a solution was sought to reduce air breakdown probability of the laser beam 12 by other means, such as an improvement in the transmission medium. Air breakdown thresholds are known to increase remarkably with a reduction in air pressure, or the use of another medium.

By using a vacuum chamber in the system 60 the laser beam 12 propagates through this chamber rather than through ambient air. An important factor for this system 60 is that a high volume of water is pumped between the laser window 66.2 and the contact surface 102 of the component 100, sufficient to eliminate any air in the path of the beam completely. The laser windows 66.1 and 66.2 used in the system 60 are specialised high power windows designed for 1064 nm (N-BK7 Fused Silica). Since these windows 66.1 and 66.2 would be exposed to extremely high power intensities during experimental testing, careful measures were taken to ensure that these operate below their damage threshold. One of the concerns were, that the change in the refractive index as the laser beam 12 propagates through the first window 66.1, and then through the vacuum 64 would change the spot size and thus incident power intensity at the second window 66.2. Therefore, a test was conducted using a ccd camera for beam spot size through the chamber 64, where N.D. filters were placed before the chamber. This showed a drastic decrease in spot size. The chamber was then vented to allow air into it in order to determine if this effect was due to the vacuum. However, a small spot size was still achieved. The test was then repeated by removing the vacuum chamber completely, and yet a small spot size was still maintained. This was an extremely significant finding, as this implied that the spot size determination by using the distance from the laser window was ineffective. After some further investigations into why the "lens performance" had changed, it was concluded that the presence of significant beam divergence from the laser is present.

The above embodiments of the system for performing an LSP process in accordance with the invention addresses the problems generally encountered by applying a thick water layer using a nozzle. These problems with the prior art are typically as a result of air-water interface effects, such as ripples in the water layer surface which result in beam scattering. The various embodiments of the system in accordance with the invention also address the difficulties the prior art has in achieving a uniform and repeatable achievement of a thick water layer which are dependent on factors such as the water flow rate, the distance of the water nozzle from the target, the height of the water jet impact compared to laser impact and the angle of the water jet impingement from the target. From the description of the various embodiments of the system according to the invention it must be clear that all of the embodiments allows for the precise control of the water layer thickness as well as the elimination of air-water interface effect, such as the breakdown at the air-water interface as well as water droplet ejections/splashing. In particular, all of the embodiments of the system according to the invention were designed to ensure that a strong secondary shockwave or cavitation event takes place after each laser pulse.

As mentioned above it is one of the objects of the inventions to provide a water confinement arrangement in which the water layer thickness can be accurately controlled for the purposes of generating a secondary shock event. During the LSP process, it is important that laser pulses with repeatable power intensity irradiate the target with each and every laser pulse. However, the nature of LSP operates at high power intensity whereby vaporization and plasma formation is only desired at the target surface. Any vaporisation or plasma formation occurring before the target surface would be considered a breakdown occurrence. Breakdown occurrences are somewhat stochastic in nature, and are highly absorbent of incident irradiation. It is necessary to achieve a repeatable power intensity delivery to the contact surface 102 of the target 100 is achievable during the LSP process as the pressure pulse generated by the impact of the laser pulse, and which is responsible for creation of compressive residual stresses in the target, is directly proportional to the square root of the incident power intensity. Therefore, in order to achieve a uniform and controlled compressive residual stress state through LSP, repeatable power intensity is required.

In view of the fact that the first bubble oscillation period when a secondary shock event or cavitation event occurs is highly related to the energy conversion process, from incident power intensity to plasma and, accordingly pressure generation, is useful as an indicator of the power intensity delivered to the target. Any reduction in power intensity delivered to the target 100 will manifest as a change in the first bubble oscillation period. The reduction in power intensity could be as a result of some type of energy loss reason such as a breakdown in air, damage to optics or contamination, for example.

Figure 23:
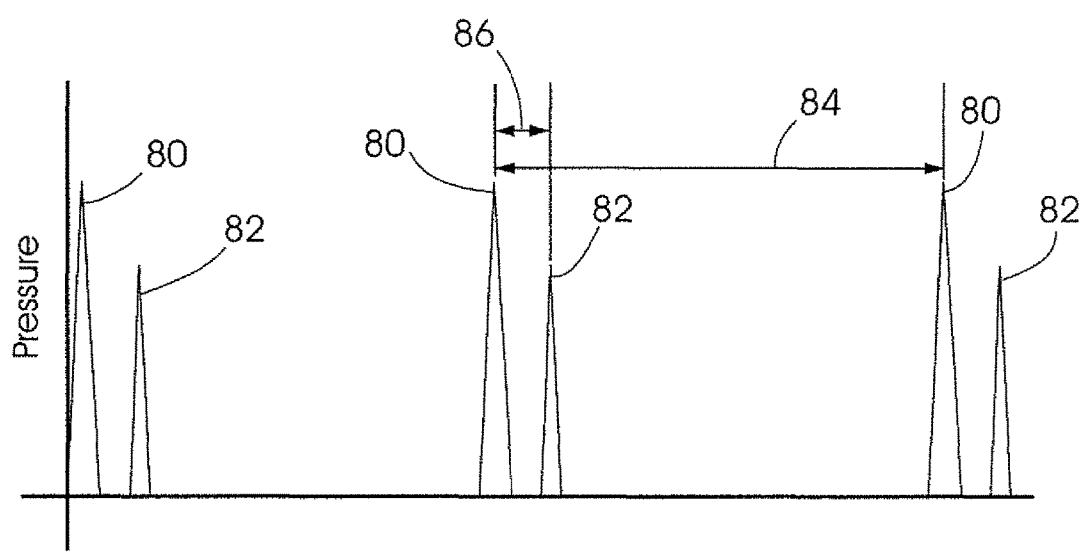
FIG. 23 shows an example of a recording of a pressure-time history taken over a short time period of an LSP process in accordance with the invention.

In order to monitor the power intensity of the laser pulse and in particular the energy delivered to the contact surface 102 of the target 100 the system according to the invention includes means for detecting and recording the first bubble oscillation period. When a secondary shock event takes place, each laser pulse generates two strong pressure pulses. The time difference between these two pulses constitutes the first bubble oscillation period. FIG. 23 shows an example of a schematic representation of an expected recording of the pressure-time history taken over a short time period of an LSP process. In FIG. 23 the primary pressure pulse generated by the laser pulse striking the contact surface 102 of the component 100 is illustrated by the reference numeral 80 while the secondary pressure pulse generated by the cavitation event is indicated by the reference numeral 82. It must be understood that each pair of primary and secondary pressure pulses 80 and 82 is as a result of a single laser pulse striking the contact surface 102. Accordingly, in FIG. 23 the second and third pair of primary and secondary pressure pulses 80 and 82 represent a second and third laser pulse striking the contact surface 102. The time duration 84 between the primary pressure pulses of the first and second laser pulses represents the laser period T, while the time duration 86 between the primary pressure pulse 80 and the secondary pressure pulse generated by the same laser pulse represents the first bubble oscillation period.

The system according to the invention could include a wide range of different types of measurement instruments and techniques to determine the first bubble oscillation period 86. From the above description it should be clear that after the pressure pulses are generated from both the initial laser pulse and the cavitation event, a shock wave or acoustic wave will propagate through both the confinement medium, which is water in the preferred embodiment, as well as the target material, which is a metal. Accordingly, a measurement instrument such as a hydrophone may be placed within the water cavity, or alternatively a transducer may be placed on the component 100 that is being treated. It is also envisaged that optical measurement instruments may be used to determine the first bubble oscillation period 86. The visual methods could be similar to the principle behind the Shadowgraph visualisations conducted during the experimental investigations described above.

Although the method of performing an LSP process on the target or component 100 should be clear from the above description of the system according to the various embodiments of the invention, it will nevertheless be described briefly again for the sake of clarity. The method includes the step of providing a device such as a Nd:YAG laser capable generating and transmitting a laser pulse. The target 100 is positioned in the laser path so that a contact surface 102 of the target is impacted by the laser pulse. A solid medium, which is transparent to incident laser light, is positioned in the laser path so as to allow the laser pulse to pass through it before striking the contact surface 102 of the target 100. In the preferred embodiment the solid medium may be either a laser window or lens, or even a combination of the two.

The method further includes supplying a fluid, preferably water, into a fluid flow path arranged between the solid medium and the contact surface 102 of the target 100 so that the fluid is in direct contact with the solid medium and the target to eliminate any air-fluid interface in the travel path of the laser pulse. The water is supplied into the fluid flow path in a controlled manner so as to create a water layer of a constant thickness over the region of the contact surface 102 of the target 100 that is being treated, thereby inducing a secondary shock event through cavitation in the fluid layer upon the collapse of a plasma bubble generated after the laser pulse striking the target.

The cavitation event in the water layer is detected as a means of monitoring the power intensity and energy of the laser pulse that is being delivered to the contact surface 102. This step includes detecting and recording the first bubble oscillation period in order to determine the bubble energy of the plasma bubble generated after the laser pulse strike the target 100. The information obtained on the first bubble oscillation period and the bubble energy can then be used to determining the pressure of the laser pulse exerted on the contact surface 102 of the target 100. It must be understood that the method according to the invention allows for the accurate monitoring of the energy being delivered to the target 100 during the LSP process. By detecting and recording the first bubble oscillation period and using this information to determine the energy that is being delivered to the target 100, there is no need to try and determine the energy losses through the system of the invention. The system and method according to the invention allows for an LSP process diagnostic technique using the first bubble oscillation period of the cavitation event to determine the energy being delivered to the target during the LSP process. The ability to determine the amount of energy being delivered to a target accurately is a significant advantage of the system and method according to the invention over known systems and methods.

From the above description of the system and method in accordance with the invention it must be clear that they are specifically designed to induce a secondary shock event or cavitation event through the accurate controlling of the water layer thickness. The system of the invention also eliminates any air-water interfaces so that there is no water ejection or splashing involved in the LSP process. The inventors believe this to be highly beneficial as the limitation on the operable repetition rate of the laser due to recovery of the water layer is eliminated. When using the system and method of the invention the laser pulses can be shot at the target at a much higher frequency than that of prior art systems. The elimination of the water-air interfaces further prevents ejected water droplets from acting as potential initiation sites for breakdown of the air medium before the water layer. This is another advantage that is not achievable by using the water jet or spray nozzles of the prior art systems.

The invention claimed is:

1. A process diagnostic method for a Laser Shock Peening process performed on a target, the method including the following steps:
   providing a device for generating and transmitting a laser pulse to the target;
   positioning the target in the laser path so that a surface of the target is impacted by the laser pulse;
   locating a solid medium in the laser path which is transparent to incident laser light to allow the laser pulse to pass through it;
   supplying a fluid into a fluid flow path arranged between the solid medium and the contact surface of the target so that the fluid is in direct contact with the solid medium and the target to eliminate any air-fluid interface in the travel path of the laser pulse;
   controlling a fluid layer of a constant thickness so as to control the occurrence of a second shock event through cavitation in the fluid layer upon the collapse of a plasma bubble generated after the laser pulse striking the target; and
   determining a first bubble oscillation period of the plasma bubble as a measure of the bubble energy in order to monitor the energy being delivered to the target by each laser pulse.

2. A method according to claim 1, wherein the first bubble oscillation period is determined by visual inspection of the expansion and contraction of the plasma bubble.

3. A method according to claim 1, wherein the first bubble oscillation period is determined by observation of the time difference between the first and second shock wave emitted by the laser induced cavitation event.

4. A method according to claim 1, wherein the first bubble oscillation period is determined by optical inspection of the expansion and contraction cycle of the plasma bubble.

5. A method according to claim 1, wherein the first bubble oscillation period is determined acoustically.

6. A method according to claim 5, including the use of a hydrophone to determine first bubble oscillation period by detecting the acoustic signature associated with the pressure differential from the first shockwave generated by the plasma expansion from the laser pulse and the secondary shock wave generated upon the collapse of the cavitation bubble.

7. A process diagnostic system for a Laser Shock Peening method performed on a target, the system including:
   a device for generating and transmitting a laser pulse to the target;
   a fluid source for supplying a fluid:
   an inlet through which the fluid is, in use, supplied;
   an outlet through which the fluid is, in use, dispensed;
   a fluid flow path arranged between the inlet and the outlet;
   a solid medium which is transparent to incident laser light to allow the laser pulse to pass through it, the fluid flow path in use being sandwiched between the solid medium and the target during the laser shock peening process so that the fluid is in direct contact with the solid medium and the target, thereby eliminating any air-fluid interface in the travel path of the laser pulse;
   means for controlling the thickness of the layer of fluid between the solid medium and the target so as to control the occurrence of a second shock event through cavitation in the fluid layer upon the collapse of a plasma bubble generated after the laser pulse striking the target; and
   means for determining a first bubble oscillation period of the plasma bubble as a measure of the bubble energy in order to monitor the energy being delivered to the target by each laser pulse.

8. A system according to claim 7, wherein the means for determining first bubble oscillation period includes means for recording the first bubble oscillation period.

9. A system according to claim 7, wherein the means for determining the first bubble oscillation period of the plasma bubble is visual so as to allow the first bubble oscillation period to be determined through the inspection of the expansion and contraction of the plasma bubble.

10. A system according to claim 7, wherein the means for determining the first bubble oscillation period of the plasma bubble allow the first bubble oscillation period to be determined by observation of the time difference between the first and second shock wave emitted by the laser induced cavitation event.

11. A system according to claim 7, wherein the means for determining the first bubble oscillation period of the plasma bubble is optical so that the first bubble oscillation period is determined by optical inspection of the expansion and contraction cycle of the plasma bubble.

12. A system according to claim 7, wherein the means for determining the first bubble oscillation period of the plasma bubble is acoustic.

13. A system according to claim 12, wherein the means for determining the first bubble oscillation period of the plasma bubble includes a hydrophone so as to determine first bubble oscillation period by detecting the acoustic signature associated with the pressure differential from the first shockwave generated by the plasma expansion from the laser pulse and the secondary shock wave generated upon the collapse of the cavitation bubble.

14. A system according to claim 7, wherein the fluid flow path is arranged such that the thickness of the laminar fluid layer is at least about 10 mm.

15. A system according to claim 7, wherein the laser generating device is capable of generating a laser pulse of an intensity of between about 0.5 and 100 $GW/cm^2$.

16. A system according to claim 15, wherein the laser pulse intensity is between about 0.5 and 10 $GW/cm^2$.

* * * * *